United States Patent
Stanforth et al.

(10) Patent No.: US 7,142,524 B2
(45) Date of Patent: Nov. 28, 2006

(54) SYSTEM AND METHOD FOR USING AN AD-HOC ROUTING ALGORITHM BASED ON ACTIVITY DETECTION IN AN AD-HOC NETWORK

(75) Inventors: Peter J. Stanforth, Winter Springs, FL (US); Eric A. Whitehill, Ft. Wayne, IN (US); Eric D. White, Cedarburg, WI (US)

(73) Assignee: MeshNetworks, Inc., Maitland, FL (US)

( * ) Notice: Subject to any disclaimer, the term of this patent is extended or adjusted under 35 U.S.C. 154(b) by 859 days.

(21) Appl. No.: 10/135,437

(22) Filed: May 1, 2002

(65) Prior Publication Data

US 2004/0081166 A1    Apr. 29, 2004

(51) Int. Cl.
*H04Q 7/00*    (2006.01)
(52) U.S. Cl. ....................... 370/328; 370/238
(58) Field of Classification Search ............... 370/328, 370/330, 238; 709/238, 222, 224, 230; 710/46
See application file for complete search history.

(56) References Cited

U.S. PATENT DOCUMENTS

| | | | |
|---|---|---|---|
| 4,494,192 A | 1/1985 | Lew et al. | 364/200 |
| 4,617,656 A | 10/1986 | Kobayashi et al. | 370/74 |
| 4,736,371 A | 4/1988 | Tejima et al. | 370/95 |
| 4,742,357 A | 5/1988 | Rackley | 342/457 |
| 4,747,130 A | 5/1988 | Ho | 379/269 |
| 4,910,521 A | 3/1990 | Mellon | 342/45 |
| 5,034,961 A | 7/1991 | Adams | 375/130 |
| 5,068,916 A | 11/1991 | Harrison et al. | 455/39 |
| 5,231,634 A | 7/1993 | Giles et al. | 370/95.1 |
| 5,233,604 A | 8/1993 | Ahmadi et al. | 370/60 |
| 5,241,542 A | 8/1993 | Natarajan et al. | 370/95.3 |
| 5,317,566 A | 5/1994 | Joshi | 370/60 |
| 5,392,450 A | 2/1995 | Nossen | 455/12.1 |
| 5,412,654 A | 5/1995 | Perkins | 370/94.1 |
| 5,424,747 A | 6/1995 | Chazelas | 342/70 |
| 5,502,722 A | 3/1996 | Fulghum | 370/69.1 |
| 5,517,491 A | 5/1996 | Nanni et al. | 370/29 |
| 5,555,425 A | 9/1996 | Zeller et al. | 395/800 |

(Continued)

FOREIGN PATENT DOCUMENTS

CA    2132180    3/1996

(Continued)

OTHER PUBLICATIONS

Wong et al., "Soft Handoffs in CDMA Mobile Systems", Dec. 1997, IEEE Personal Communications.

(Continued)

*Primary Examiner*—Huy D. Vu
*Assistant Examiner*—Chuong Ho
(74) *Attorney, Agent, or Firm*—Randi L. Karpinia; Joseph J. Buczynski

(57) ABSTRACT

A system and method for detecting communication requirements in a network and placing nodes in various stages of activity where conditions allow. The system and method provides an algorithm to detect changes in node activity levels and alter operations, such as update transmissions and route selections, based upon changes detected. In particular, the algorithm determines activity level at a node at each routing update interval based on factors such as a number of new destinations the node can reach, a number of route modifications that the node can implement, a number of routes from the node whose lengths have changed and a number of destinations the node can no longer reach. The node can then increase or decrease the rate that it exchanges its routing information with neighboring nodes based on an increase or decrease in this activity level.

14 Claims, 2 Drawing Sheets

U.S. PATENT DOCUMENTS

| | | | | |
|---|---|---|---|---|
| 5,555,540 | A | 9/1996 | Radke | 370/16.1 |
| 5,572,528 | A | 11/1996 | Shuen | 370/85.13 |
| 5,615,212 | A | 3/1997 | Ruszczyk et al. | 370/433 |
| 5,618,045 | A | 4/1997 | Kagan et al. | 463/40 |
| 5,621,732 | A | 4/1997 | Osawa | 370/79 |
| 5,623,495 | A | 4/1997 | Eng et al. | 370/397 |
| 5,627,976 | A | 5/1997 | McFarland et al. | 395/308 |
| 5,631,897 | A | 5/1997 | Pacheco et al. | 370/237 |
| 5,644,576 | A | 7/1997 | Bauchot et al. | 370/437 |
| 5,652,751 | A | 7/1997 | Sharony | 370/227 |
| 5,680,392 | A | 10/1997 | Semaan | 370/261 |
| 5,684,794 | A | 11/1997 | Lopez et al. | 370/337 |
| 5,687,194 | A | 11/1997 | Paneth et al. | 375/283 |
| 5,696,903 | A | 12/1997 | Mahany | 395/200.58 |
| 5,701,294 | A | 12/1997 | Ward et al. | 370/252 |
| 5,706,428 | A | 1/1998 | Boer et al. | 395/200 |
| 5,717,689 | A | 2/1998 | Ayanoglu | 370/349 |
| 5,745,483 | A | 4/1998 | Nakagawa et al. | 370/335 |
| 5,774,876 | A | 6/1998 | Woolley et al. | 705/28 |
| 5,781,540 | A | 7/1998 | Malcolm et al. | 370/321 |
| 5,787,080 | A | 7/1998 | Hulyalkar et al. | 370/348 |
| 5,794,154 | A | 8/1998 | Bar-On et al. | 455/509 |
| 5,796,732 | A | 8/1998 | Mazzola et al. | 370/362 |
| 5,796,741 | A | 8/1998 | Saito et al. | 370/439 |
| 5,805,593 | A | 9/1998 | Busche | 370/396 |
| 5,805,842 | A | 9/1998 | Nagaraj et al. | 395/306 |
| 5,805,977 | A | 9/1998 | Hill et al. | 455/31.3 |
| 5,809,518 | A | 9/1998 | Lee | 711/115 |
| 5,822,309 | A | 10/1998 | Ayanoglu et al. | 370/315 |
| 5,844,900 | A | 12/1998 | Hong et al. | |
| 5,844,905 | A | 12/1998 | McKay et al. | 370/443 |
| 5,845,097 | A | 12/1998 | Kang et al. | 395/297 |
| 5,857,084 | A | 1/1999 | Klein | 395/309 |
| 5,870,350 | A | 2/1999 | Bertin et al. | 365/233 |
| 5,877,724 | A | 3/1999 | Davis | 342/357 |
| 5,881,095 | A | 3/1999 | Cadd | 375/202 |
| 5,881,372 | A | 3/1999 | Kruys | 455/113 |
| 5,886,992 | A | 3/1999 | Raatikainen et al. | 370/410 |
| 5,896,561 | A | 4/1999 | Schrader et al. | 455/67.1 |
| 5,903,559 | A | 5/1999 | Acharya et al. | 370/355 |
| 5,909,651 | A | 6/1999 | Chander et al. | 455/466 |
| 5,936,953 | A | 8/1999 | Simmons | 370/364 |
| 5,943,322 | A | 8/1999 | Mayor et al. | 370/280 |
| 5,987,011 | A | 11/1999 | Toh | 370/331 |
| 5,987,033 | A | 11/1999 | Boer et al. | 370/445 |
| 5,991,279 | A | 11/1999 | Haugli et al. | 370/311 |
| 6,028,853 | A | 2/2000 | Haartsen | 370/338 |
| 6,029,217 | A | 2/2000 | Arimilli et al. | 710/107 |
| 6,034,542 | A | 3/2000 | Ridgeway | 326/39 |
| 6,044,062 | A | 3/2000 | Brownrigg et al. | 370/238 |
| 6,047,330 | A | 4/2000 | Stracke, Jr. | 709/238 |
| 6,052,594 | A | 4/2000 | Chuang et al. | 455/450 |
| 6,052,752 | A | 4/2000 | Kwon | 710/126 |
| 6,064,626 | A | 5/2000 | Stevens | 365/233 |
| 6,067,291 | A | 5/2000 | Kamerman et al. | 370/338 |
| 6,078,566 | A | 6/2000 | Kikinis | 370/286 |
| 6,104,712 | A | 8/2000 | Robert et al. | 370/389 |
| 6,108,738 | A | 8/2000 | Chambers et al. | 710/113 |
| 6,115,580 | A | 9/2000 | Chuprun et al. | 455/1 |
| 6,122,690 | A | 9/2000 | Nannetti et al. | 710/102 |
| 6,130,881 | A | 10/2000 | Stiller et al. | 370/238 |
| 6,132,306 | A | 10/2000 | Trompower | 453/11.1 |
| 6,147,975 | A | 11/2000 | Bowman-Amuah | 370/252 |
| 6,163,699 | A | 12/2000 | Naor et al. | 455/453 |
| 6,173,323 | B1 * | 1/2001 | Moghe | 709/224 |
| 6,178,337 | B1 | 1/2001 | Spartz et al. | 455/561 |
| 6,192,053 | B1 | 2/2001 | Angelico et al. | 370/448 |
| 6,192,230 | B1 | 2/2001 | Van Bokhorst et al. | 455/343 |
| 6,208,870 | B1 | 3/2001 | Lorello et al. | 455/466 |
| 6,223,240 | B1 | 4/2001 | Odenwald et al. | 710/129 |
| 6,240,294 | B1 | 5/2001 | Hamilton et al. | 455/456 |
| 6,246,875 | B1 | 6/2001 | Seazholtz et al. | 455/432 |
| 6,249,516 | B1 | 6/2001 | Brownrigg et al. | 370/338 |
| 6,275,707 | B1 | 8/2001 | Reed et al. | 455/456 |
| 6,285,892 | B1 | 9/2001 | Hulyalkar | 455/574 |
| 6,304,556 | B1 | 10/2001 | Haas | 370/254 |
| 6,327,300 | B1 | 12/2001 | Souissi et al. | 375/219 |
| 6,349,091 | B1 | 2/2002 | Li | 370/238 |
| 6,349,210 | B1 | 2/2002 | Li | 455/450 |
| 6,480,505 | B1 | 11/2002 | Johansson et al. | |
| 6,640,268 | B1 * | 10/2003 | Kumar | 710/46 |
| 6,665,311 | B1 * | 12/2003 | Kondylis et al. | 370/462 |
| 6,788,702 | B1 * | 9/2004 | Garcia-Luna-Aceves et al. | 370/458 |
| 6,816,862 | B1 * | 11/2004 | Mulgund et al. | 707/10 |
| 6,973,335 | B1 * | 12/2005 | Ganton | 455/573 |
| 2001/0053699 | A1 | 12/2001 | McCrady et al. | 455/513 |
| 2002/0013856 | A1 * | 1/2002 | Garcia-Luna-Aceves et al. | 709/238 |
| 2003/0033394 | A1 * | 2/2003 | Stine | 709/222 |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al., "A Pattern Recognition System for Handoff Algorithms", Jul. 2000, IEEE Journal on Selected Areas in Communications, vol. 18, No. 7.

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28-Mar. 3, 1999, 2nd Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols", Oct. 25-30, 1998, Proceeding of the 4th Annual ACM/IEEE International Conference on Mobile Computing and Networking.

C. David Young, "USAP: A Unifying Dynamic Distributed Multichannel TDMA Slot Assignment Protocol".

Chip Elliot and Bob Heile, "Self-Organizing, Sef-Healing Wireless Networks", 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks using Transmit Power Adjustment".

Ram Ramanathan and Martha E. Steenstrup, "Hierarchically-Organized, Multihop Mobile Wireless Networks for Quality-of-Service Support".

Martha E. Steenstrup, "Dynamic Multipoint Virtual Circuits for Multimedia Traffic in Multihop Mobile Wireless Networks".

Zhenyu Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

* cited by examiner

SYSTEM AND METHOD FOR USING AN AD-HOC ROUTING ALGORITHM BASED ON ACTIVITY DETECTION IN AN AD-HOC NETWORK

BACKGROUND OF THE INVENTION

1. Field of the Invention

The present invention relates to a system and method for managing node communications in a wireless ad-hoc network based upon node activity status. More particularly, the present invention relates to a system and method for detecting communication requirements in a network and placing nodes in an inactive state where conditions allow. Detection of increased communication requirements is used to place nodes in various stages of activity and to alter network communication routes based upon node activity levels in the network.

2. Description of the Related Art

In recent years, a type of mobile communications network known as an "ad-hoc" network has been developed to address the needs of multiple mobile device communication beyond traditional infrastructure coverage. In this type of network, each user terminal (hereinafter "mobile node") is capable of operating as a base station or router for other mobile nodes within the network, thus eliminating the need for a fixed infrastructure of base stations. Accordingly, data packets being sent from a source mobile node to a destination mobile node are typically routed through a number of intermediate mobile nodes before reaching the destination node.

More sophisticated ad-hoc networks are also being developed which, in addition to enabling mobile nodes to communicate with each other as in conventional ad-hoc networks, further enable the mobile nodes to access fixed networks and communicate with other types of user terminals, such as those on the public switched telephone network (PSTN) and the Internet. Details of these advanced types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, and in U.S. patent application Ser. No. 09/815,164 entitled "Prioritized-Routing for an Ad-Hoc, Peer-to-Peer, Mobile Radio Access System", filed on Mar. 22, 2001, the entire content of each being incorporated herein by reference.

In such ad-hoc networks, data flow is from node to node, and relies heavily on optimum route selection. Factors such as transmission power consumption and pipeline delays play a critical role in selecting transmission routes through the network. For example, certain service classes such as voice data, requires minimal pipeline delays during transmission. However, minimizing pipeline delays often increases transmission power levels, which may overly burden the limited power supply of mobile nodes. One approach to improving mobile node power consumption efficiency includes placing nodes into varying degrees of inactivity, as allowed by communication requirements.

For example, when a node in a network is not active, it can go into a more dormant state where it can send fewer packets, thus reducing its over-the-air bandwidth consumption, and significantly reduce the power drain on its battery and the batteries of other nodes which receive those packets, to achieve maximum useful life for the node batteries. This is especially useful when considering the deployment of remote sensor nodes where long life of node batteries is critical. Sensor nodes are nodes which are capable of performing the node functions described above, but can also monitor, for example, environmental conditions such as temperature, humidity, wind, and so on. Such sensor nodes, or sensors, belong to a class of devices that need to have network capability, but utilize the network sporadically, and are potentially inactive for long periods of time.

As can be appreciated by one skilled in the art, nodes in a network not only transmit, receive and route packets of information from node to node within the network, but also transmit, receive and route packets to and from nodes located beyond the network. Nodes in the ad-hoc network generate these packets, which may be classified as either data packets or control packets. The distinction between data and control packets allows node participation within the network to be modified based on whether or not the node is active at a given point in time. That is, data packets include packets which are generated by the user and perform some activity, such as using streaming video applications. Control packets are created to discover other nodes, build routing tables and share network topology between nodes. Therefore, as among network nodes, sending and receiving control packets with greater frequency results in more accurate and complete knowledge of the network.

A problem with frequent packet transmission, however, is that node transmitters used in packet transmission typically are the largest power consuming component of the node. Therefore, for each instance where node transmitter use may be avoided by not sending messages, significant power consumption savings can be achieved. However data packets, as compared to control packets, may not be avoided to the same extent, as data packets are generated by the user and perform some activity. Control packet transmissions however, may be reduced in situations where the need for node updates are smaller.

Ad-hoc networks typically require a mechanism by which to discover other nodes, build routing tables and share network topology amongst the nodes. This is achieved using messaging that is typically described as overhead messaging, and may contain control packet transmissions. Control packet transmissions are required, for example, to the extent node updates are needed. Therefore, reducing the need for frequent node updates is one approach to reducing transmitter usage in network nodes. Many ad-hoc networks typically have update rates that are in the order of 1 to 5 seconds, based on the presumption of high rates of change and high traffic demand. One approach to reducing node updates has been to design a network where the network nodes are synchronized and all "wake up" at the same time to share information. However, this is not always an effective technique of achieving power savings through reduced node activity. For example, in such an arrangement, because a node cannot transfer data until the "wake up" time, frequent update delays may result. Furthermore, the network nodes cannot always be easily synchronized with one another. Implementing data updates at "wake up" is particularly difficult in a mobile ad-hoc network where nodes join and leave the network arbitrarily and on a regular basis.

Accordingly, a need exists for a system and method to reduce the frequency of control packet transmissions in an ad-hoc network, thereby reducing demand on limited power supplies at mobile nodes.

SUMMARY OF THE INVENTION

An object of the present invention is to provide a system and method for placing nodes within an ad-hoc network into various stages of inactivity based upon network communication requirements.

Another object of the present invention is to provide a system and method for calculating required data updates for nodes within an ad-hoc network based upon node activity levels.

Still another object of the present invention is to calculate transmission routes based upon node activity levels.

These and other objects are substantially achieved by providing a system and method for determining communication requirements and placing nodes within an ad-hoc network into various stages of inactivity. The system and method provides an algorithm to detect changes in node activity levels and alter operations, such as update transmissions and route selections, based upon changes detected. In particular, the algorithm determines activity level at a node at each routing update interval based on factors such as a number of new destinations the node can reach, a number of route modifications that the node can implement, a number of routes from the node whose lengths have changed and a number of destinations the node can no longer reach. The node can then increase or decrease the rate that it exchanges its routing information with neighboring nodes based on an increase or decrease in this activity level.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
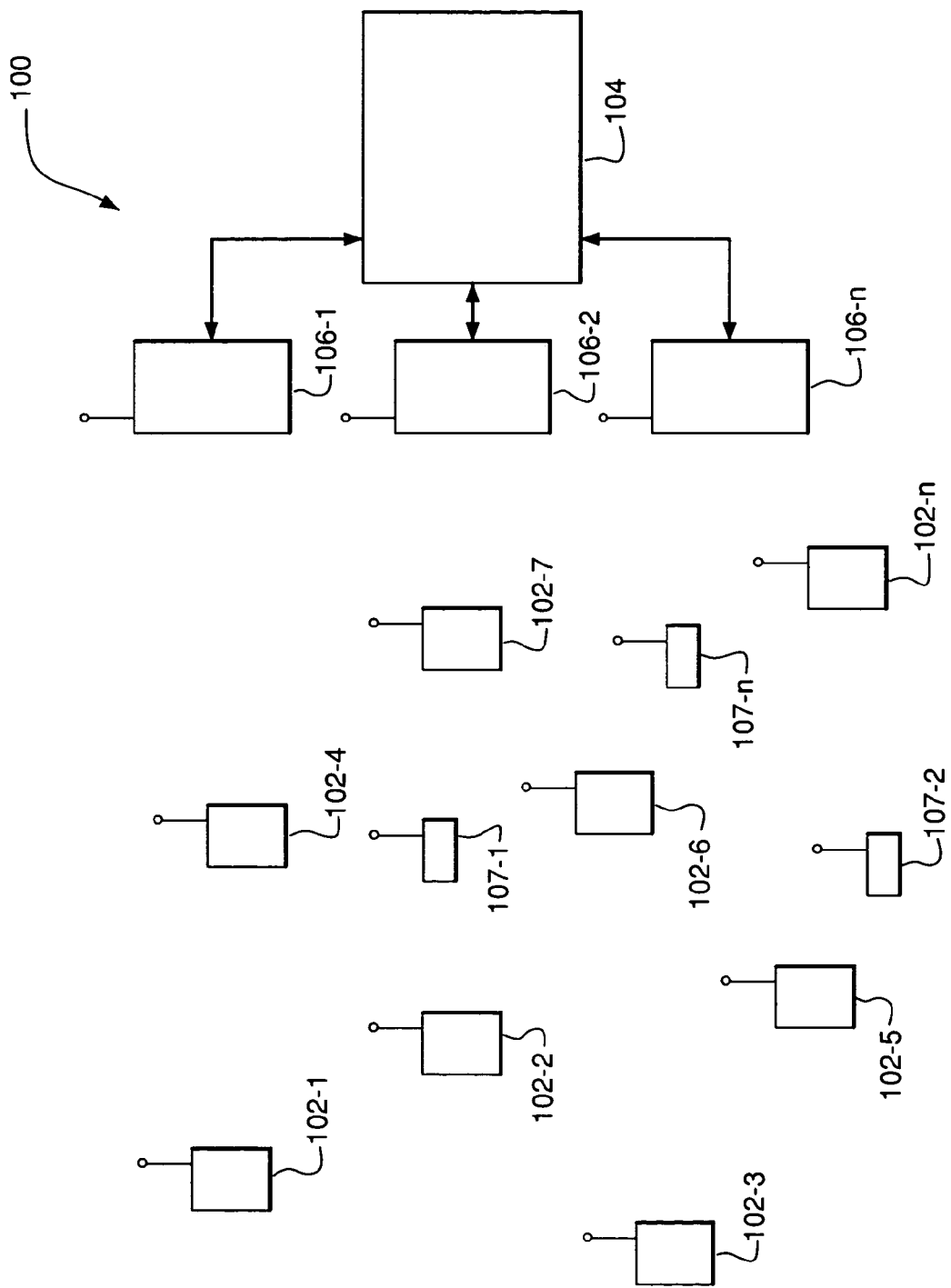
FIG. 1 is a block diagram of an example of an ad-hoc wireless communications network including a plurality of nodes employing an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, . . . 106-n (referred to generally as nodes 106 or access points 106), for providing nodes 102 with access to the fixed network 104. The fixed network 104 can include, for example, a core local access network (LAN), and a plurality of servers and gateway routers, to provide network nodes with access to other networks, such as other ad-hoc networks, the public switched telephone network (PSTN) and the Internet. The network 100 further can include a plurality of fixed routers 107-1 through 107-n (referred to generally as nodes 107 or fixed routers 107) for routing data packets between other nodes 102, 106 or 107. It is noted that for purposes of this discussion, the nodes discussed above can be collectively referred to as "nodes 102, 106 and 107", or simply "nodes".

Depending on the type of application or environment in which the network 100 is being used, the mobile nodes 102, as well as the fixed routers 107, can be configured as sensor nodes. Sensor nodes, or sensors, belong to a class of devices that need to have network capability, but utilize the network sporadically, potentially being inactive for long periods of time. Sensor nodes can monitor conditions, for example, environmental data such as temperature, humidity, wind velocity and so on, and can provide that information to a central collection. Typically, a network 100 whose nodes 102 and/or 107 are configured as sensor nodes would not include a fixed network 104 and IAPs 106 as described above. A sensor network will perform the same operations as a traditional network, however a sensor network allows slightly different operational tuning, such as minimum update times. Furthermore, the network 100 typically would not commingle regular mobile nodes 102 and regular fixed routers 107 with mobile nodes 102 and fixed routers 107 that are configured as sensors. In other words, the network 100 would typically include either sensor-type nodes, or regular nodes and routers (and possibly LAPs 106), but not both. However, the scope of the invention is not limited to this restriction, and circumstances may arise in which sensor nodes and "regular" nodes are used in a common network 100.

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. No. 5,943,322 to Mayor, which is incorporated herein by reference, and in U.S. patent application Ser. Nos. 09/897,790, 09/815,157 and 09/815,164, referenced above.

Figure 2:
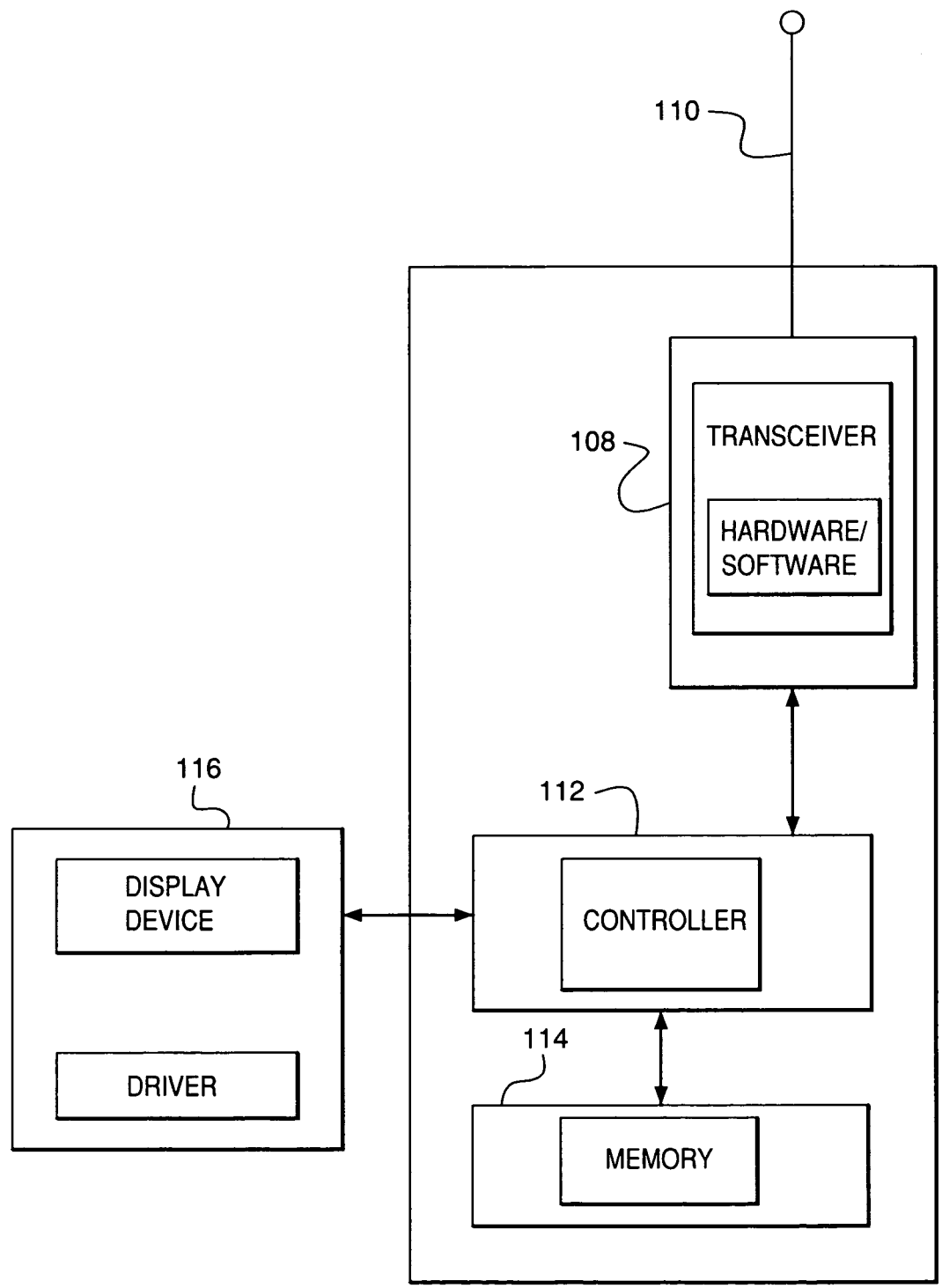
FIG. 2 is a block diagram of an example of a wireless node as shown in FIG. 1.

As shown in FIG. 2, each node 102, 106 and 107 includes a transceiver 108 which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM), that is capable of storing, among other things, routing information pertaining to itself and other nodes in the network 100. The nodes 102, 106 and 107 exchange their respective routing information, referred to as routing advertisements or routing table information, with each other via a broadcasting mechanism periodically, for example, when a new node enters the network 100, or when existing nodes in the network 100 move.

As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

As shown in FIG. 1, the deployment of nodes 102, 106 and 107 within network 100 are of mixed characteristics, ranging from highly mobile devices to full stationary devices, each potentially having a broad range of node activity profiles. The activity of a node 102, 106 or 107 in FIG. 1 has two components. The first component is defined by the frequency with which the node wants to communicate with other nodes and/or other networks. The second component of node activity is defined by the rate at which the node's location within the network changes. An example of the manner in which this rate of change, or in other words, the mobility of the node, can be measured and monitored is described in U.S. patent application Ser. No. 09/987,102, entitled "System and Method for Determining the Measure of Mobility of a Subscriber Device in an Ad-Hoc Wireless Network with Fixed Wireless Routers and Wide Area Network (WAN) Access Points", filed on Nov. 13, 2001, the entire contents of which being incorporated herein by reference. The node is inactive if it is both stationary and silent (i.e. not communicating), but if the node starts moving, or wants to communicate something, it is becoming more active. The embodiment of the present invention described below presents a method and system for managing the rate of change for a node 102, 106 or 107 from inactive to active, and vice-versa.

To date, the deployment of network architectures has been for wide area, highly mobile applications. However, there are scenarios where a mobile ad-hoc network is appropriate, but will exhibit reduced node activity behavior. Knowledge of the activity of network nodes can be used to greatly reduce the amount of information that needs to be distributed in periodic control messages that are exchanged between nodes. An inactive node 102, 106 or 107 can reduce the frequency of its control packet information exchange. Other nodes of the network 100 will not be required to share information about these inactive nodes as frequently with other nodes due to the fact that, while in an inactive state, the inactive node is not being used, and no outside entities are trying to make contact with them.

When a node 102, 106 or 107 becomes active, either due to node movement or node communication activity, the controller 112, for example, of the node becoming active will execute a setup control message exchange bringing the state of that node to active to the key members of the network 100, such as other neighboring nodes 102, 106 or 107, required to effectively route the information between the node and the external entity. At that point, the newly active node's control information will become more widespread through the part of the network 100 local to the node (i.e., the nodes neighbors that are within the nodes broadcast range), to thus assist with the effective and reliable delivery of data payloads.

Typically, when nodes 102, 106 and 107 of network 100 are inactive, the update rates can be as slow as 30 seconds or longer, which can be referred to as the passive refresh rate. While the nodes are simply maintaining basic connectivity, the age of update information is not critical. However once a node 102, 106 or 107 wants to send or receive information, the node needs more accurate network information, so update rates are increased. When each node of network 100 is in a passive listening mode, each is routinely receiving routing and network update messages, at a slow rate, and sending update messages at the same slow rate, until there is a demand for network traffic.

When a node 102, 106 or 107 senses a request to send data, the node increases it's update rate (for example, to a new rate equal to twice the passive refresh rate). If the node, or terminal, is actively involved in the routing of information, as the source, sink or an intermediate router, it will increase its update rate even further (for example, to a new rate equal to four times the passive refresh rate). Once the traffic subsides, the node will slowly reduce the raised update rate back down to the passive rate.

In network 100 of FIG. 1, a node listens for activity on the reservation channel after power on to discover nodes that are participating in the network. Once the node has built a preliminary network map, it advertises itself and it's view of the network 100 as a precursor to actively participating in the network 100, and sending routine updates. However, it is possible that all nodes 102, 106 and 107 within the node's neighborhood may currently be hibernating. Therefore, even if the node does not see any network traffic, it is not necessarily the only node in the neighborhood. The node should thus send a broadcast message to see if it can wake any sleeping neighbors nodes in the network 100.

Also in accordance with an embodiment of the present invention, a "power on" algorithm, in use with nodes 102, 106 and 107 operating at various levels of activity, may be used to determine routing table update intervals. As discussed earlier, updates to the routing table requires control packet transmissions which adversely affect mobile node power consumption levels. In an embodiment of the present invention discussed below, the frequency of required updates is determined, and a maximum interval between updates is calculated. Using a maximum interval between updates, the lowest possible number of transmissions are achieved.

In addition, each node 102, 106 and 107 maintains basic connectivity and continually exchanges updates with other nodes to some extent. When nodes are active, updates may be received with greater frequency. When nodes are inactive, updates may be received with less frequency, and are constantly monitored for the deviations which result in a transition from an inactive to active state. The route interval is based on the rate of change of entries and their routing locations within a routing table.

The routing metric for each node can be computed by, for example, its controller 112 as the sum of deviations from the previous update. For purposes of the following discussion, a node for which a routing metric is being calculated will be referred to as a "subject node" to distinguish it from its neighboring nodes. The deviations are computed as follows:

$$\text{Sum} = \text{new destinations} + \text{new next hops} + \text{new routing lengths} + \text{deleted destinations} \quad (1)$$

Each term of equation (1) has an integer value. The "new destinations" variable represents the number of new destinations that the node can reach, the "new next hops" variable represents the route modifications caused by alternate paths which come about as the changes in neighbor routing tables are incorporated, the "new routing lengths" represents the number of routes that the node can use whose lengths have changed, and the "deleted destinations" represents the number of destinations that the node can no longer reach. The sum produced by equation (1) can be extended to include other routing metrics such as bandwidth utilization, congestion (both nodal and within the neighborhood), battery level, and network fragmentation (strongly connected with multiple alternate routes or weakly connected where each route is important).

It is noted that over a period of time, the sum calculated by equation (1) at each update interval will produce a series of sum values. By plotting these values with respect to time, a function of the trend in the sum values will be created. Hence, the degree by which the rate of exchange of routing information by that node should be increased or decreased can be determined based on the derivative of that function.

For example, when the subject node remains stationary, and all of its neighboring nodes remain stationary, the value of sum calculated by equation (1) above is zero. That is, a network of stationary nodes will not generate any "new destinations", "new next hops", "new routing lengths" or "deleted destinations", as no position changes occur. If the subject node and its neighboring nodes remain constant for several updates, the function of the plot of sum values over time does not increase or decrease. For instance, a constant routing table, such as would be expected in a deployed closed network of static sensors, would yield a derivative of zero. Hence, the derivative of that function (which is a straight horizontal line) taken at any routing update interval is zero. Accordingly, no increase or decrease in the rate of exchange of routing information by the subject node is necessary. Rather, where a derivative of zero is produced, the routing algorithm run by the controller 112 of the subject node directs the use of maximum time intervals between routing updates, where the time intervals may be selectable based upon network requirements or other design factors.

This is likewise the case when the sum values remain at a certain value over a period of time. For example, assuming that the variables of equation (1) result in a value of 5 for several updates, then the function is also a straight horizontal line for that period, and the derivative of the function taken at any of those update intervals is thus zero. Hence, even though movement may be occurring by the subject node or the other nodes in the network, if that movement is such that the sum value does not change from update to update, then the rate at which the subject node exchanges routing information with its neighboring nodes does not change.

On the contrary, if the movement of the subject node and/or the other nodes in the network is such that the sum values change from update to update, the derivative of the function taken at those updates will change from update to update. For example, if the movement of the subject node and/or its neighboring nodes produces a certain sum value from equation (1) at an update interval, and then produces a larger sum value at the next update interval, the function plotted between those intervals will be an increasing line. The derivative of that function will thus be a positive value. If the sum value continues to increase from update interval to update interval, the derivative taken at each interval will be a positive value, and can increase if the increase in the sum value is larger from update interval to update interval.

Accordingly, as the derivative of the sum increases, the rate of routing updates must be increased to respond to increased dynamism within the network and force the network connectivity to a steady state. That is, as the derivative of the algorithm becomes positive, the rate of routing information exchange increases to respond to the change in the routing tables. Once a steady state has been achieved, the rate of routing updates can be reduced again to save battery power.

On the other hand, if the sum values decrease from update interval to update interval, the function plotted between those intervals will be a decreasing line. Accordingly, the derivative taken at any of those intervals will be negative. As the derivative becomes negative, the rate of routing information exchange is slowed to recover the bandwidth which is no longer required due to lack of change in the routing tables.

In the case of an instantaneous positive change, followed by a zero derivative, the rate of exchange is slowed gradually to insure that the algorithm does not lead to an oscillating exchange rate. An example of an instantaneous change that could lead to oscillation is the activation of a new node. In this case, routing information is exchanged at a rate greater than the minimum rate to insure that the locality information of the new node is propagated to destinations which might seek to find it. Without a gradual slowdown, nodes which advertise this new node could cause a rapid reaction to the new next hops and routing lengths which may rise as the network converges to the optimum routes.

Additionally, inactive nodes are better candidates for use as a router in the case where routes are chosen between active nodes and inactive nodes. Using an active node would result in the further decrease of throughput for the active node if it were chosen as a router because it is transmitting its own data as well as the data for the node using the active node as a router. This knowledge is propagated to other nodes by including it in periodic control traffic as a routing metric enabling these informed decisions.

Another benefit of the present invention is the ability to elevate the priority of the active nodes within the network 100, making the assumption that other nodes will be more likely to perform operations involving the active node, and thus can elevate the priority of data involving the active nodes, thus increasing the over-all efficiency of how nodes process data. This priority elevation will also cause the network itself to increase the distribution of the active node's control information to a wider area to give the data stream more routing options through the network increasing the robustness and reliability of that data stream.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A method for controlling communication in an ad-hoc wireless network based upon node activity, comprising:
   determining an activity level at a node using an algorithm, said node having an information exchange rate at which said node sends information to at least one other neighboring node in said network; and
   changing said information exchange rate in response to a change in said activity level, wherein said algorithm determines said activity level according to the following equation:

Sum = new destinations+new next hops+new routing lengths+deleted destinations where sum represents a sum of one or more deviations from a previous information update, new destination represents a number of new destinations said node can reach, new next hops represents a number of route modifications said node can implement, new routing lengths represents a number of routes from said node whose lengths have changed and deleted destinations represents a number of destinations said node can no longer reach.

2. A method as claimed in claim 1, wherein said activity level comprises:
   a first component defined by a frequency with which said node wants to communicate with other nodes and/or other networks; and
   a second component defined by the rate at which said node's location within said network changes.

3. A method as claimed in claim 1, wherein said node sends said information in the form of data packets.

4. A method as claimed in claim 1, wherein said information includes routing information pertaining to said node.

5. A method as claimed in claim 1, wherein said changing increases or decreases said information exchange rate in response to an increase or decrease, respectively, in said activity.

6. A method as claimed in claim 1, wherein said information exchange rate has a minimum value when said activity level is at a minimum.

7. A method as claimed in claim 1, wherein said node includes a sensor, mobile device, router or intelligent access point.

8. A node in an ad-hoc communication network, adapted to control its communication based upon node activity, said node comprising:
a controller, adapted to determine an activity level at said node using a first algorithm, said node having an information exchange rate at which said node sends information to at least one other neighboring node in said network; and
said controller being further adapted to change said information exchange rate in response to a change in said activity level,
wherein said algorithm determines said activity level according to the following equation:

Sum=new destinations+new next hops+new routing lengths+deleted destinations where sum represents a sum of one or more deviations from a previous information update, new destination represents a number of new destinations said node can reach, new next hops represents a number of route modifications said node can implement, new routing lengths represents a number of routes from said node whose lengths have changed and deleted destinations represents a number of destinations said node can no longer reach.

9. A node as claimed in claim 8, wherein said activity level comprises:
a first component defined by a frequency with which said node wants to communicate with other nodes and/or other networks; and
a second component defined by the rate at which said node's location within said network changes.

10. A node as claimed in claim 8, further comprising a transmitter which is adapted to send said information in the form of data packets.

11. A node as claimed in claim 8, wherein said information includes routing information pertaining to said node.

12. A node as claimed in claim 8, wherein said controller increases or decreases said information exchange rate in response to an increase or decrease, respectively, in said activity.

13. A node as claimed in claim 8, wherein said information exchange rate has a minimum value when said activity level is at a minimum.

14. A node as claimed in claim 8, wherein said node includes a sensor, mobile device, router or intelligent access point.

* * * * *